(12) United States Patent
Kim et al.

(10) Patent No.: US 8,190,317 B2
(45) Date of Patent: May 29, 2012

(54) MODE CHANGE CONTROL METHOD OF HYBRID VEHICLE

(75) Inventors: Sang Joon Kim, Seoul (KR); Joon Young Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 901 days.

(21) Appl. No.: 12/283,328

(22) Filed: Sep. 10, 2008

(65) Prior Publication Data

US 2009/0312895 A1    Dec. 17, 2009

(30) Foreign Application Priority Data

Jun. 11, 2008 (KR) .................. 10-2008-0054790

(51) Int. Cl.
*G05D 3/00* (2006.01)

(52) U.S. Cl. ............... 701/22; 701/42; 701/60; 701/61; 701/67; 903/902; 180/65.245; 180/65.31; 180/65.1; 477/3; 477/8; 477/17; 477/27; 477/34; 318/139

(58) Field of Classification Search .............. 701/22, 701/42, 60, 61, 67, 51, 84, 87; 903/902; 180/65.245, 65.31, 65.1; 477/3, 8, 17, 27, 477/34; 318/139
See application file for complete search history.

(56) References Cited

U.S. PATENT DOCUMENTS

| 2007/0056784 A1* | 3/2007 | Joe et al. | 180/65.2 |
| 2007/0102207 A1* | 5/2007 | Yamanaka et al. | 180/65.3 |
| 2007/0259755 A1* | 11/2007 | Tanishima | 477/3 |
| 2009/0312895 A1* | 12/2009 | Kim et al. | 701/22 |

FOREIGN PATENT DOCUMENTS

| JP | 2002-349310 | 12/2002 |
| JP | 2007-069804 | 3/2007 |
| JP | 2007-126091 | 5/2007 |
| KR | 10-2007-0049069 | 5/2007 |

* cited by examiner

*Primary Examiner* — Redhwan K Mawari
(74) *Attorney, Agent, or Firm* — Edwards Wildman Palmer LLP; Peter F. Corless (57) ABSTRACT

The present invention provides a mode change control method of a hybrid vehicle, which can improve driving performance and power performance and provide a more stable vehicle behavior control during a mode change from an EV mode to a HEV mode. For this purpose, a transmission input speed is compared with an engine idle speed. If the transmission input speed is lower than the engine idle speed, the pressure of a clutch is open-loop controlled so that an optimal engine torque of operation point determination circuit can be transferred to the clutch. On the other hand, if the transmission input speed is equal to or higher than the engine idle speed, the clutch pressure is feedback-controlled so that a delta RPM follows a target delta RPM profile.

4 Claims, 9 Drawing Sheets

Fig. 1

| Phase | Description | ENGAGEMENT METHOD | Engine | Motor | ISG | CLUTCH PRESSURE |
|---|---|---|---|---|---|---|
| Clutch Open | CLUTCH CONTROL STANDBY STATE (Clutch Sate = Open) | - | Off/Cranking | Demand Torque | Off/Cranking Torque | WHEN DETERMINED THAT ENGAGEMENT IS REQUIRED → MAINTAINING RETURN SPRING FORCE AFTER INITIAL FILL • WHEN DETERMINED THAT ENGAGEMENT IS NOT REQUIRED → 0 |
| Speed Control | •ENGINE SPEED CONTROL FOR CLUTCH SLIP AFTER ENGINE COMPLETE EXPLOSION •PERFORMING ENGINE SPEED CONTROL BY ISG IN FUEL CUT STATE | TRANSMISSION INPUT SPEED < IDLE SPEED | Torque Profile | Demand Torque | Speed Control (UP TO IDLE SPEED) | MAINTAINING RETURN SPRING FORCE AFTER INITIAL FILL |
|  |  | TRANSMISSION INPUT SPEED > IDLE SPEED | Torque Profile | Demand Torque | Speed Control (UP TO TARGET DELTA RPM) |  |
| Slip Control | SLIP CONTROL STATE: SELECTING CONTROL METHOD ACCORDING TO CASES | TRANSMISSION INPUT SPEED < IDLE SPEED | Idle Speed Control | Demand Torque – CLUTCH TRANSFER TORQUE | 0 | OPEN-LOOP CONTROL FOR TRANSFERRING OPTIMAL ENGINE TORQUE OF OPERATION POINT DETERMINATION CIRCUIT TO CLUTCH |
|  |  | TRANSMISSION INPUT SPEED > IDLE SPEED | CLUTCH TRANSFER TORQUE | Demand Torque – CLUTCH TRANSFER TORQUE | 0 | Target Delta RPM |
| Max Pressure Control | MAXIMUM PRESSURE APPLIED STATE FOR FULL LOCK-UP AFTER SPEED SYNCHRONIZATION | TRANSMISSION INPUT SPEED < IDLE SPEED | Idle Speed Control | Demand Torque – CLUTCH TRANSFER TORQUE | 0 | MAXIMUM PRESSURE |
|  |  | TRANSMISSION INPUT SPEED > IDLE SPEED | CLUTCH TRANSFER TORQUE | Demand Torque – CLUTCH TRANSFER TORQUE | 0 | MAXIMUM PRESSURE |
| Full Lock-up | CLUTCH CONTROL STANDBY STATE (Clutch Sate = Open) | - | OPTIMAL ENGINE TORQUE OF OPERATION POINT DETERMINATION CIRCUIT | OPTIMAL MOTOR TORQUE OF OPERATION POINT DETERMINATION CIRCUIT | 0 | MAXIMUM PRESSURE |
| Release Control | CONTROL STATE FOR CLUTCH OPEN | - | Friction Tq. FUEL CUT: UPON ENGINE BRAKE RELEASE | Demand Torque | 0 | 0 |

MODE CHANGE CONTROL METHOD OF HYBRID VEHICLE

CROSS-REFERENCE TO RELATED APPLICATION

This application claims under 35 U.S.C. §119(a) the benefit of Korean Patent Application No. 10-2008-0054790 filed Jun. 11, 2008, the entire contents of which are incorporated herein by reference.

BACKGROUND (a) Technical Field

The present invention relates to a mode change control method of a hybrid vehicle. More particularly, the present invention relates to a method of controlling the mode change from electric vehicle to hybrid electric vehicle.

(b) Background Art

A hybrid vehicle is a vehicle driven by at least two different types of power source. When the term 'hybrid vehicle' is used, it most often refers to a vehicle that is driven by an engine which generates a rotational force by burning a fuel (fossil fuel such as gasoline) and an electric motor which generates a rotational force with electric power of a battery to achieve better fuel efficiency with reduced exhaust gas.

Figure 1:
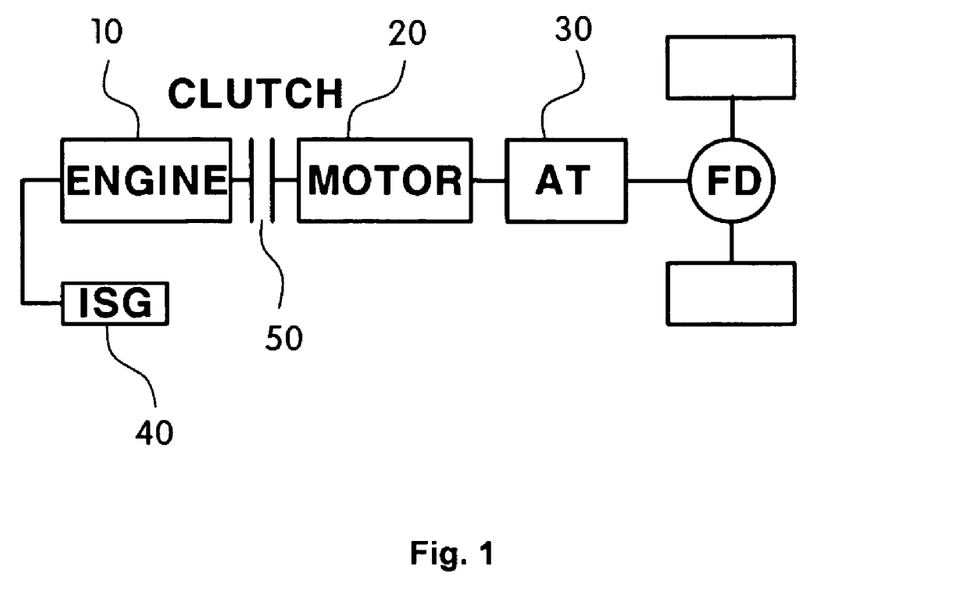
FIG. 1 is a schematic diagram showing a configuration of a hybrid vehicle.

FIG. 1 shows a schematic configuration of the hybrid vehicle. The hybrid vehicle includes an engine 10, an electric motor 20 (drive motor), and an automatic transmission 30. Particularly, the engine 10 and the drive motor 20 are connected to each other with an engine clutch 50 interposed therebetween, and the drive motor 20 and the automatic transmission 30 are connected to each other. An integrated starter-generator (ISG) for providing rotational force, i.e., cranking torque, to the engine 10 during start-up is connected to the engine 10.

The hybrid vehicle is driven by using only the power from the drive motor 20 during vehicle start-up or low speed driving operation. Since the engine efficiency is lower than the motor efficiency during initial start-up, it is advantageous that the initial start-up of the vehicle is performed using the drive motor 20 instead of the engine 10 in terms of fuel efficiency. After vehicle start-up, the ISG 40 starts the engine 10 so as to simultaneously use the engine power and the motor power.

In other words, the hybrid vehicle is driven in an electric vehicle (EV) mode, which is directed to a pure electric vehicle mode using only the rotational force of the drive motor 20, or in a hybrid electric vehicle (HEV) mode, which is an auxiliary mode using the rotational force of the drive motor as an auxiliary power source with the use of the rotational force of the engine as a main power source. A mode change from EV to HEV is achieved with the start-up of the engine by the ISG 40.

In order to perform torque control of the hybrid vehicle, it is necessary to accurately calculate a driver demand torque to meet the intention of the driver. For this purpose, an operation point determination circuit of a controller of the hybrid vehicle calculates an optimal operation point of the engine and the drive motor to perform a torque distribution control of the engine and the drive motor.

That is, since the driver demand torque is satisfied with "engine torque+motor torque," the operation point determination circuit calculates torque command values of the engine and the drive motor based on the optimal operation points and outputs torque commands to the engine and the drive motor so as to satisfy the driver demand torque. Then, an engine controller and a motor controller control the engine and the drive motor to output torque corresponding to the torque command, respectively, thus satisfying the driver demand torque.

For example, when a high engine power is required (e.g., the driver fully depresses an accelerator pedal), the engine power is maintained at an optimal operation condition and any deficiency of power is supplemented by the motor. As a result, it is possible to drive the vehicle with high engine efficiency while satisfying the driver demand power.

On the other hand, when a low engine power is required (e.g., the driver slightly depresses the accelerator pedal), the engine power is reduced accordingly while the engine power other than the power required to drive the vehicle is used to generate electricity in the drive motor and the generated electricity is charged to a battery.

The mode change from EV to HEV in the hybrid vehicle is one of the most important functions and one of the factors that affect the driving performance, fuel efficiency and power performance of the hybrid vehicle.

Precise mode change control is essential and an optimal mode change algorithm in accordance with the driving state is necessary. In the mode change control, a clutch control is a major factor, and an accurate control of the clutch is related to the drive performance and the power performance of the hybrid vehicle.

A conventional method performs EV/HEV mode change in such a manner that a clutch pressure is feedback-controlled for a target slip amount [We (engine speed)−Wm (motor speed)]; however, it has the following problems.

In a case where the slip continues as transmission input speed (i.e. motor speed) is lower than engine idle speed such as when the vehicle is driven on a steep slope or a mild slope during idle creep, for the conventional method to control the clutch, it is necessary to: (a) accurately determine a gradient (additional hardware may be required); (b) determine an accurate vehicle load in consideration of the gradient; and, (c) define a target slip amount for all cases in consideration of the gradient and the vehicle load. In order to satisfy all of requirements (a), (b) and (c), controllers have to perform a considerable amount of operations, which entails various problems such as complex algorithm, excessive number of calibration variables, high CPU load, deterioration of driving performance and power performance, and unstable vehicle behavior.

Accordingly, there is a need for a method for performing the control by a more simplified process.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art.

In one aspect, the present invention provides a mode change control method of a hybrid vehicle, the method comprising: (a) comparing a transmission input speed with an engine idle speed, if a mode change from EV to HEV is required; (b) open-loop controlling the pressure of a clutch so that an optimal engine torque of an operation point determination circuit is transferred through the clutch after engine complete explosion and speed increase control occur, if it is determined that the transmission input speed is lower than the engine idle speed; and (c) applying a maximum clutch pressure, if a delta RPM, which is a difference between an engine speed and a motor speed, is reduced below a predetermined synchronization reference value, thus completing the EV to HEV mode change.

In another aspect, the present invention provides a mode change control method of a hybrid vehicle, the method comprising: (a) comparing a transmission input speed with an engine idle speed, if a mode change from EV to HEV is required; (b) open-loop controlling the pressure of a clutch so that an optimal engine torque of the operation point determination circuit can be transferred to the clutch, if it is determined that the transmission input speed is lower than the engine idle speed; and (c) feedback controlling the clutch pressure so that a delta RPM follows a target delta RPM profile, if it is determined that the transmission input speed is equal to or higher than the engine idle speed.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein:

FIG. 2 is a diagram showing a method of controlling an engine, a motor, an ISG and a clutch according to respective control phases during a mode change in accordance with an embodiment of the present invention;

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

In the mode change control method of a hybrid vehicle according to an embodiment, a clutch engagement process is determined according to a transmission input speed (motor speed) during a mode change from EV to HEV. In particular, the transmission input speed is compared with an engine idle speed (idle rpm) and divided into a case where the transmission input speed is equal to or higher than the engine idle speed and a case where the transmission input speed is lower than the engine idle speed. The engine and clutch pressure are then optimally controlled according to the respective cases.

The control process may be performed by various controllers provided in the hybrid vehicle. The controllers include a hybrid control unit (HCU) that is a superior controller of the hybrid vehicle, an engine control unit (ECU) that controls the overall operation of the engine, a motor control unit (MCU) that controls the overall operation of a drive motor and an ISG, and a transmission control unit (TCU) that controls a transmission.

An operation point determination circuit of the HCU calculates a driver demand torque based on a signal of an accelerator pedal sensor, calculates an optimal engine torque and an optimal motor torque based on calculation of the maximum efficiency from the driver demand torque, and transmits a torque command to the ECU and the MCU, respectively. Then, the ECU and the MCU control the engine and the drive motor, respectively, so as to output torque corresponding to the torque command, thereby satisfying the driver demand torque.

Moreover, the HCU calculates a clutch pressure control value based on various control variables and transmits a pressure command to the TCU. Then, the TCU (or a clutch controller) performs the clutch pressure control based on the pressure command.

FIG. 2 is a diagram showing a method of controlling the engine, the motor, the ISG and the clutch according to the respective control phases during the mode change from EV to HEV. As shown in the figure, the control phases during the mode change may be classified into a clutch open phase, a speed control phase, a slip control phase, a maximum pressure control, a full lock-up phase, and a clutch release control phase.

Referring to FIG. 2, in an engine switch-off state or in an engine cranking state of the EV mode, the control phase is the clutch open phase and, at this time, a motor torque control is performed to satisfy the driver demand torque in a state where there is no engine torque output. The ISG is in a switch-off state or in a cranking torque output state for engine start-up. Moreover, in the clutch pressure control, the clutch controller (or TCU) performs an initial fill control, in which a working fluid is filled into an empty space of the clutch when clutch engagement is required during engine start-up and then maintains the clutch pressure as much as a return spring force (i.e., maintains the clutch pressure as much as a repulsive force of a return spring just before the clutch transmits torque). The initial fill control is performed to enable the working fluid to be filled sufficiently in the clutch when a predetermined time has elapsed in a state where the clutch is disengaged and to enable the clutch to be engaged even when a slight pressure is applied. Of course, in a state where the clutch engagement is not required, the clutch pressure is maintained at "0".

In the speed control phase for engine start-up, an engine speed control for clutch slip is performed after a fuel in the engine burns in a complete explosion (i.e., the engine reaches complete explosion). At this time, if the transmission input speed is higher than the idle speed of the engine, the engine is controlled based on a torque profile for increasing the engine speed until a current clutch slip amount [delta RPM ($\Delta$rpm) =We (engine speed)–Wm (motor speed)], reaches a predetermined slip start delta RPM (start slip amount), and the motor is controlled to satisfy the driver demand torque. On the contrary, if the transmission input speed is lower than the idle speed of the engine, the engine speed is increased to the idle speed, which is a target engine speed for slip. Moreover, the speed of the ISG is feedback-controlled up to a target delta RPM (transmission input speed>idle speed) or the idle speed of the engine (transmission input speed<idle speed), and the clutch pressure is maintained at a level corresponding to the return spring force.

The control of the engine and the clutch pressure is also selectively performed based on the transmission input speed in the slip control phase. That is, if the transmission input speed is equal to or higher than the idle speed of the engine, the engine torque is controlled according to an optimal engine torque calculated by the operation point determination circuit based on the driver demand torque. The motor is controlled so as to satisfy "motor torque=driver demand torque−clutch transfer torque Tc". The clutch pressure is feedback-controlled so that the delta RPM (=engine speed−motor speed, i.e., clutch slip amount) follows a predetermined target delta RPM (target slip amount) profile (hereinafter, "first control mode"). At this time, the clutch transfer torque is calculated from a clutch transfer torque transfer torque calculation formula based on the current clutch pressure. On the contrary, if the transmission input speed is lower than the idle speed of the engine, the engine speed is maintained at the idle speed, which is the target engine speed for slip, and the motor is controlled to satisfy "motor torque=driver demand torque−clutch transfer torque Tc" (here, the clutch transfer torque is equal to the engine torque of the operation point determination circuit). Especially, for the clutch pressure, an open-loop control for transferring an optimal engine torque of the operation point determination circuit to the clutch is performed (hereinafter, "second control mode"). Accordingly, the clutch transfer torque becomes the optimal engine torque of the operation point determination circuit and, during the open-loop control, the clutch pressure may be calculated from the clutch transfer torque calculation formula using an optimal engine torque value of the operation point determination circuit.

Next, in the maximum pressure control phase, a maximum pressure is applied to the clutch for full lock-up after speed synchronization. Subsequently, in the clutch full lock-up phase, as the mode change to HEV is completed, the maximum pressure state of the clutch is maintained and, at the same time, the engine and the motor are controlled according to the optimal engine torque and the optimal motor torque of the operation point determination circuit. Then, in a fuel cut state of the engine or in an engine brake release state, a control for disengaging the clutch is performed and, in the release control phase, the pressure applied to the clutch becomes "0".

For reference, the clutch transfer torque is calculated using a well-known clutch transfer torque calculation formula, e.g., a coulomb friction transfer torque (Tc) expressed by the following formula 1.

$$\text{Coulomb friction transfer torque } (Tc) = nf \times mu \times Ap \times (Ps-Pn) \times \text{bar}^2 \text{N/m}^2 \times Rm \times sgn(\Delta\text{rpm}) \quad \text{[Formula 1]}$$

wherein nf represents the number of clutch friction plates, mu represents a friction coefficient, f($\Delta$rpm, ATF Temp), Ap represents the area of a hydraulic piston (m$^2$) acting on the clutch, Ps represents a clutch pressure considering a hydraulic response (bar), Pn represents a return spring force (bar), Rm represents a clutch effective radius (m), and bar$^2$N/m$^2$ represents 100,000 (for converting the unit of pressure into the unit of torque).

Based on formula 1, the transfer torque transferred to the motor through the clutch can be accurately calculated, and the calculation result is used to compensate the motor torque by the amount corresponding to a negative transfer torque in the friction start by the clutch slip, thus compensating the driver demand torque to a desired level. As a result, it is possible to improve the driving performance.

Meanwhile, in the mode change control process, the clutch engagement process is determined according to the transmission input speed in the slip control phase, and the clutch pressure control is selectively performed in accordance with the respective cases, which will be described in more detail below.

Figure 3:
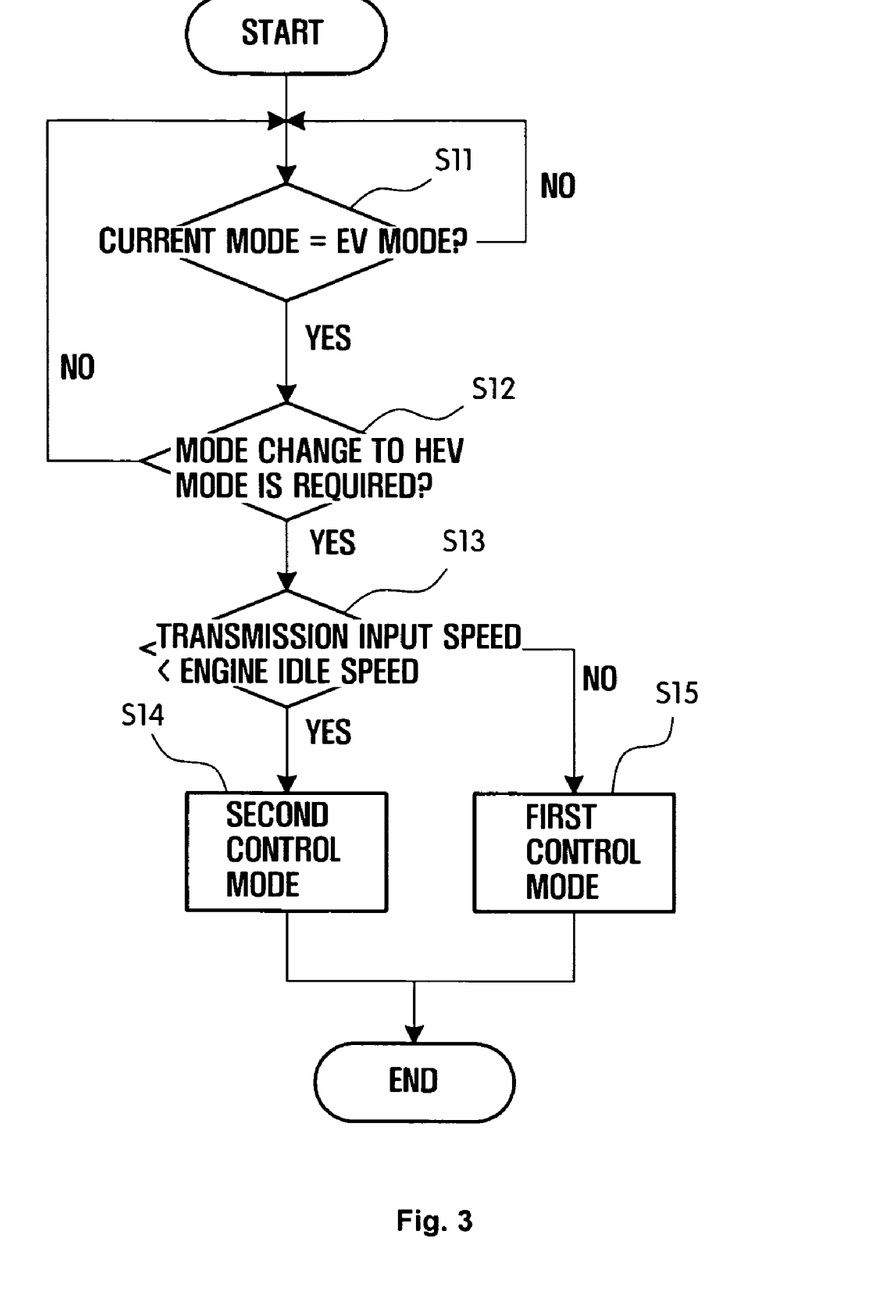
FIG. 3 is a flowchart showing a clutch engagement process selected during the mode change in accordance with the present invention.
Figure 4:
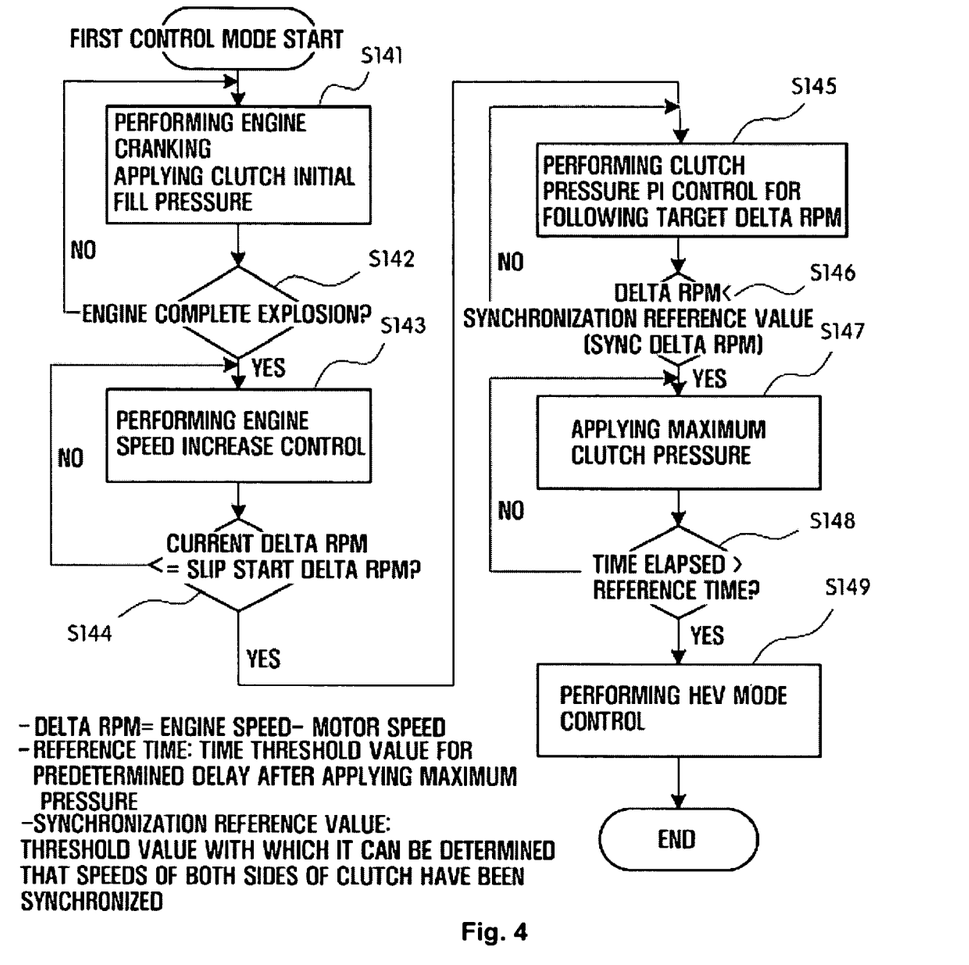
FIG. 4 is a flowchart showing a clutch engagement process during a first control mode selected based on a transmission input speed in accordance with the present invention.
Figure 5:
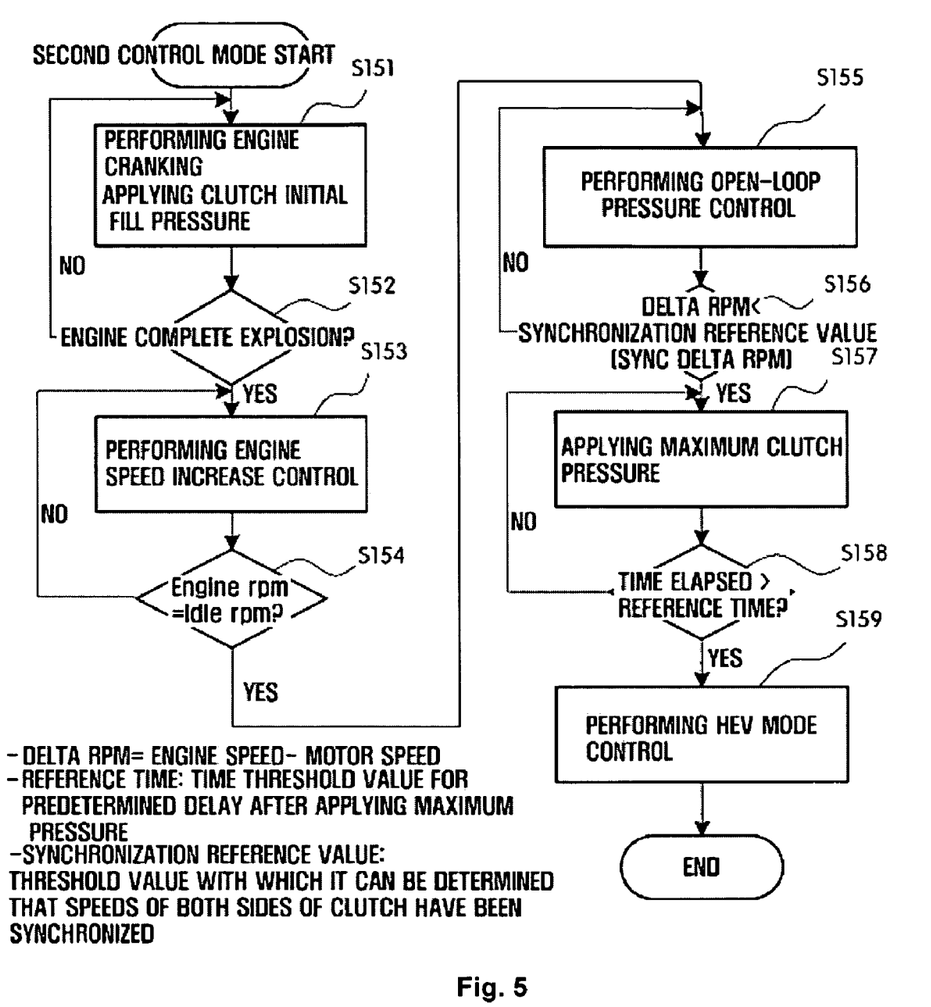
FIG. 5 is a flowchart showing a clutch engagement process during a second control mode selected based on the transmission input speed in accordance with the present invention.
Figure 6:
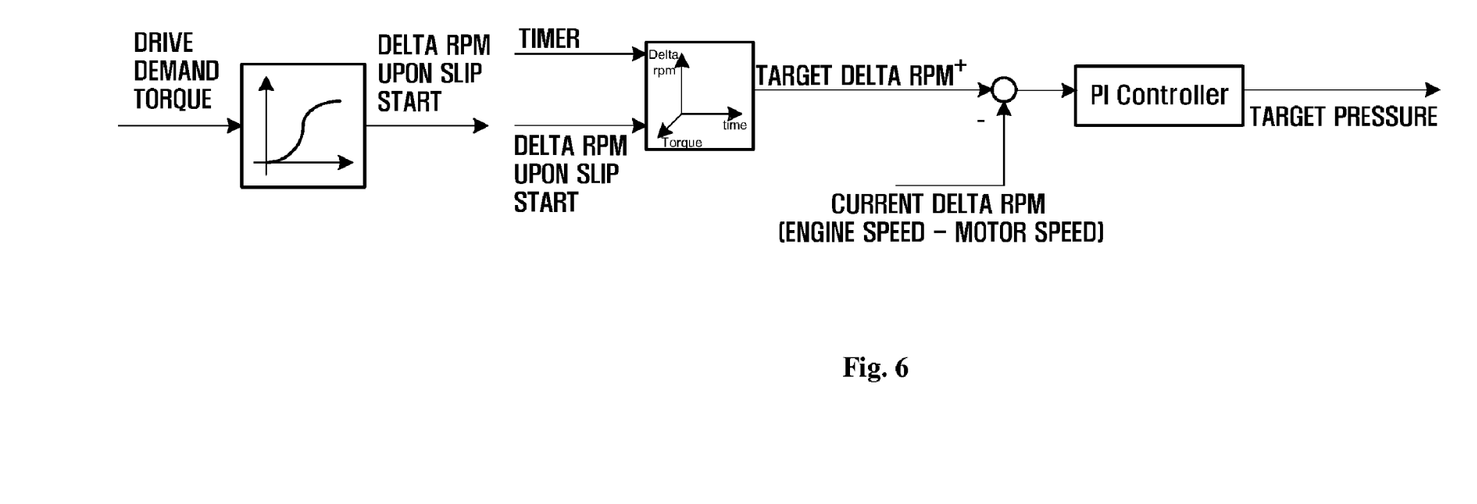
FIG. 6 is a diagram showing the first control mode in accordance with the present invention.
Figure 7:
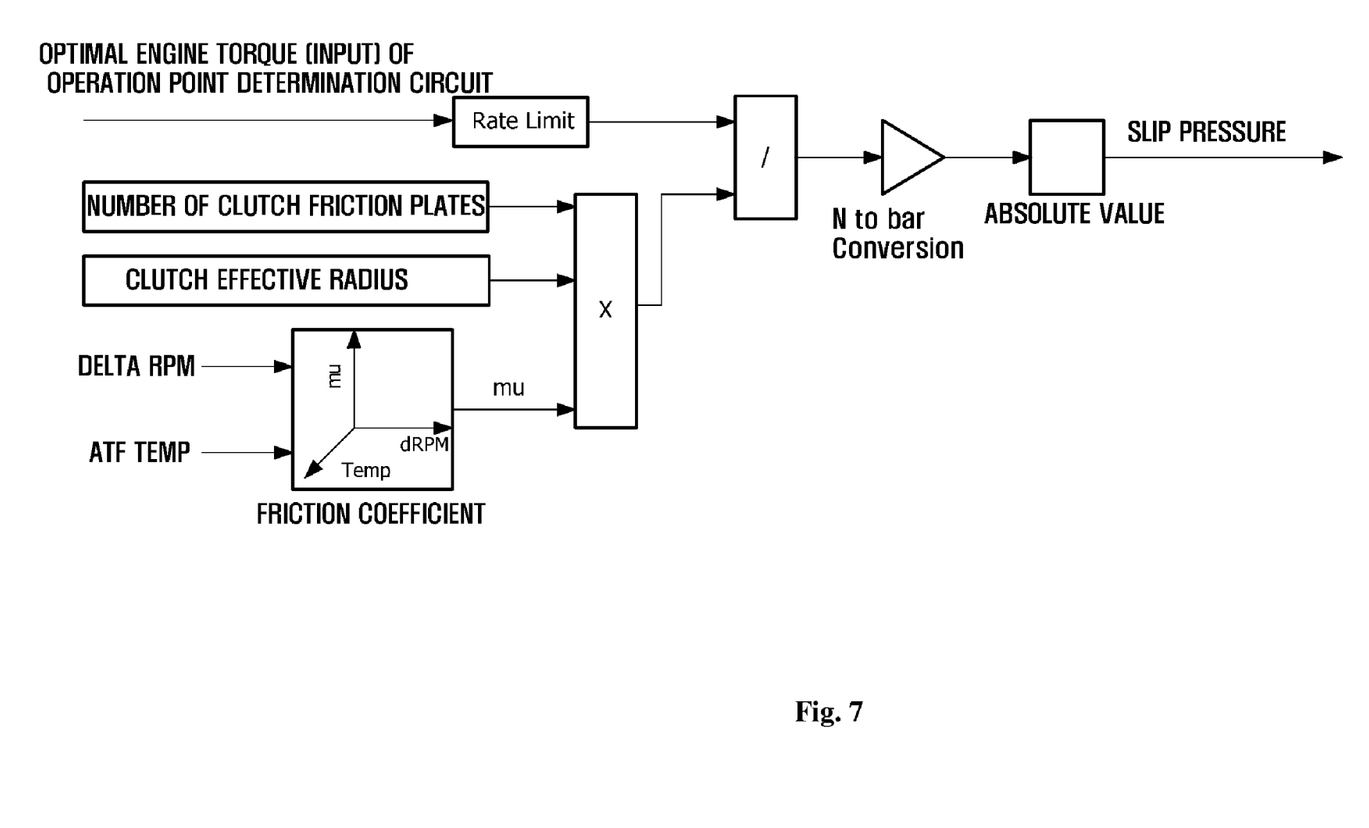
FIG. 7 is a diagram showing the second control mode in accordance with the present invention.

FIG. 3 is a flowchart showing the clutch engagement process selected during the mode change in accordance with the present invention, FIG. 4 is a flowchart showing the clutch engagement process during a first control mode selected based on the transmission input speed in accordance with the present invention, and FIG. 5 is a flowchart showing the clutch engagement process during a second control mode selected based on the transmission input speed in accordance with the present invention. FIG. 6 is a diagram showing the first control mode in accordance with the present invention, FIG. 7 is a diagram showing the second control mode in accordance with the present invention, FIG. 8 is a diagram showing the control state of the engine, the motor, the ISG and the clutch pressure during the first control mode in the mode change process in accordance with the present invention, and FIG. 9 is a diagram showing the control state of the engine, the motor, the ISG and the clutch pressure during the second control mode in the mode change process in accordance with the present invention.

As shown in FIG. 3, if the current mode is EV (S11) and if the mode change from EV to the HEV mode is required (S12), the transmission input speed (motor speed) is compared with the idle speed of the engine (S13) to determine whether the transmission input speed is higher than the idle speed, and the first control mode is performed if it is determined that the transmission input speed is equal to or higher than the engine idle speed and the second control mode is performed if it is determined that the transmission input speed is lower than the engine idle speed (S14 and S15).

As mentioned above, if the transmission input speed is equal to or higher than the engine idle speed, the rotational speeds of both sides of the clutch are synchronized, and thus it is possible to maintain the engine cranking even if the clutch is locked up. However, if the driver demand torque is high, an impact may occur during the lock-up, and thereby a feedback control for controlling the clutch pressure of the first control mode, i.e., the delta RPM (slip amount), is performed.

Figure 8:
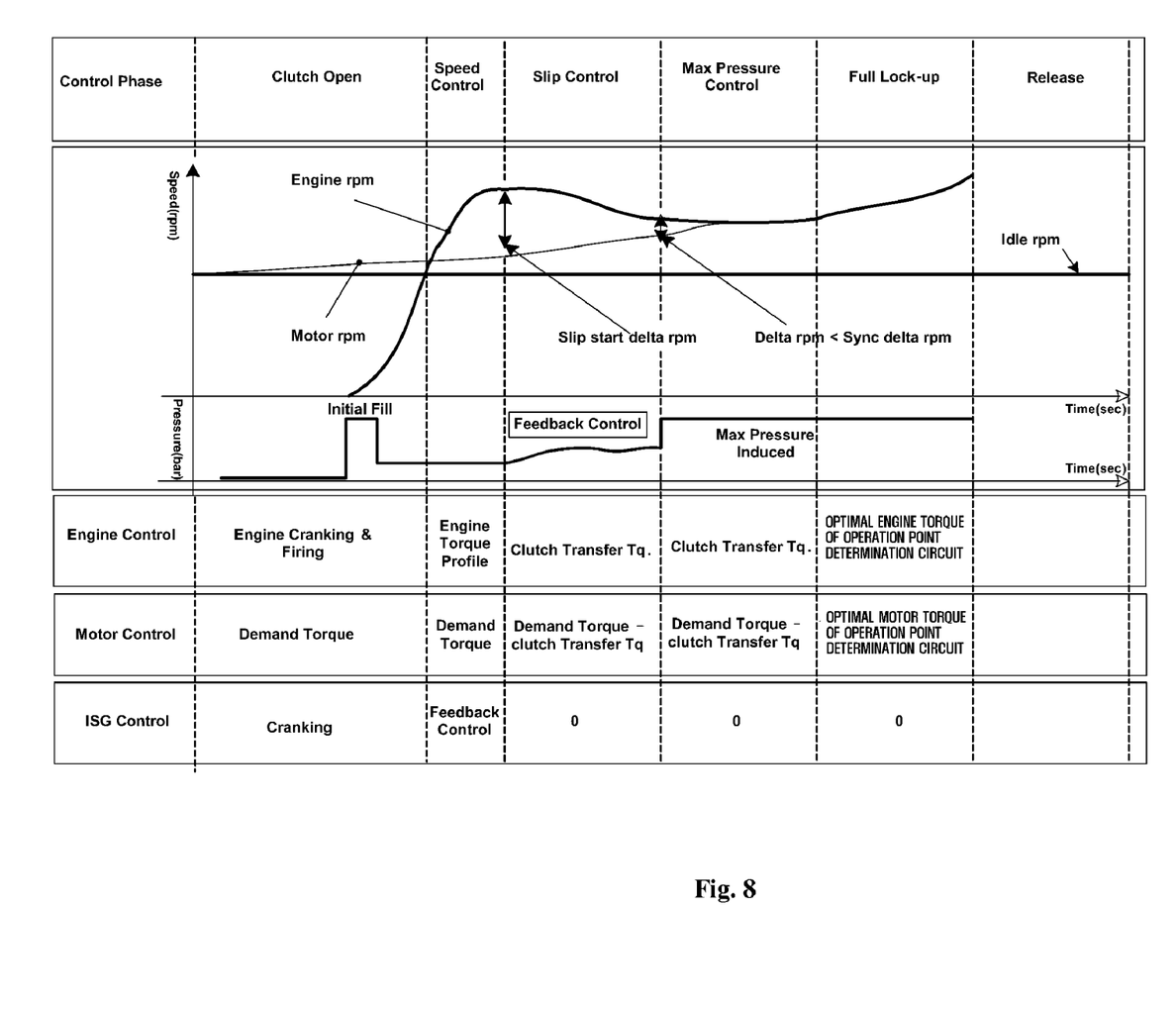
FIG. 8 is a diagram showing a control state of an engine, a motor, an ISG and a clutch pressure during the first control mode in the mode change process in accordance with the present invention.
Figure 9:
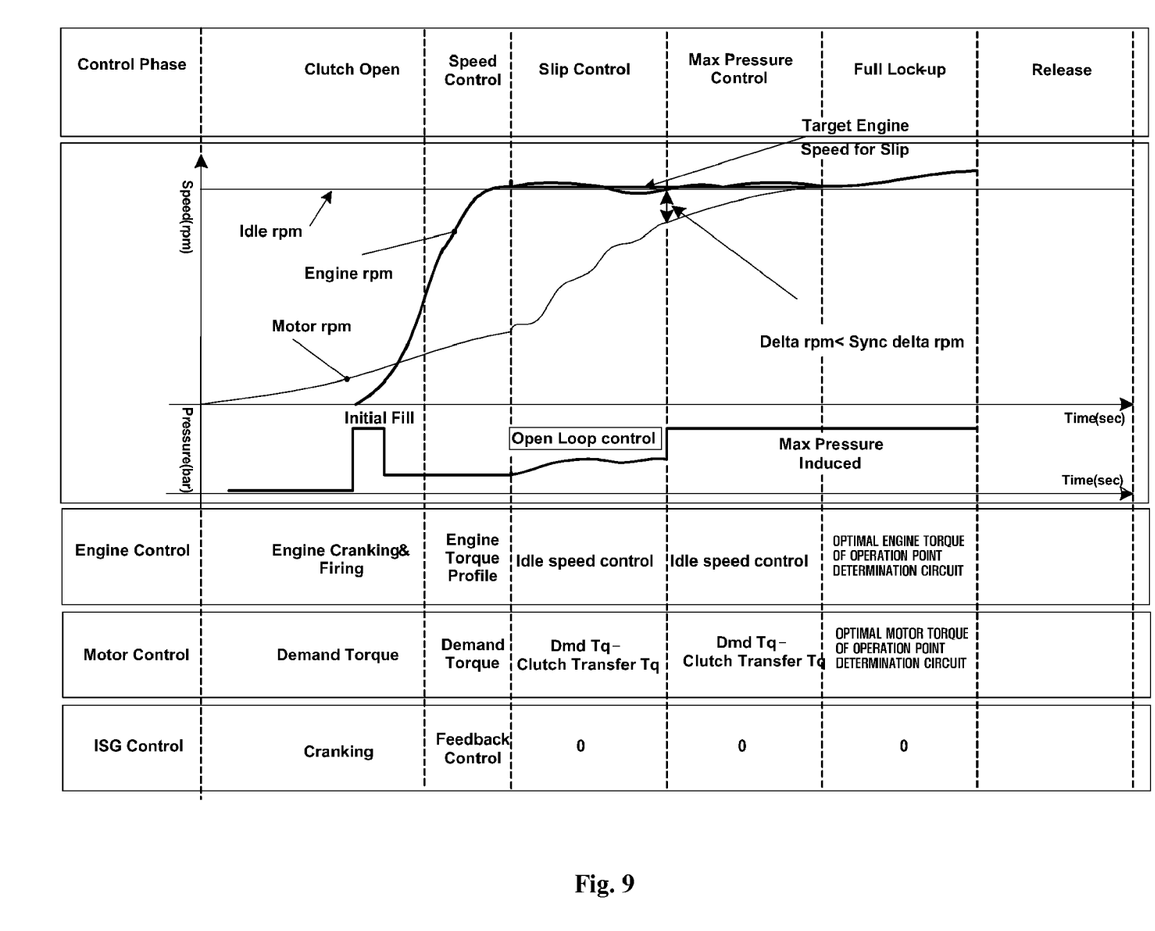
FIG. 9 is a diagram showing a control state of an engine, a motor, an ISG and a clutch pressure during the second control mode in the mode change process in accordance with the present invention.

In more detail, if the first control mode is determined, as shown in FIGS. 4 and 8, a cranking torque control and a feedback control of the ISG are performed while the motor torque control is performed to satisfy the driver demand torque during engine start-up, and the engine cranking and ignition are performed. After the initial fill control of the clutch is performed (S141), it is determined whether the engine has reached complete explosion (S142).

If it is determined that the engine has reached complete explosion, the engine speed is increased (S143) until the delta RPM [We (engine speed)—Wm (motor speed)=slip amount] reaches the slip start delta RPM (start slip amount), and the clutch pressure is feedback-controlled (PI controlled) to follow the target delta RPM (target slip amount) from the time point when the delta RPM has reached the slip start delta RPM (S144 and S145).

Then, if the delta RPM is reduced below a predetermined synchronization reference value (Sync Delta rpm), a maximum clutch pressure is applied (S146 and S147). If a predetermined reference time elapses after applying the maximum pressure, the mode change to HEV is completed, and then the HEV mode control is performed (S148 and S149).

The synchronization reference value (Sync Delta rpm) is a threshold value, with which it can be determined that the speeds of both sides of the clutch have been synchronized, and the reference time is a time threshold value for a predetermined delay after applying the maximum pressure.

In the first control mode, the target slip amount of both sides of the clutch is controlled. More particularly, the target slip amount is converted into a profile according to a predetermined time so as to perform the clip control, and the PI control is performed (to calculate the pressure) so as to follow the profile. The torque transferred through the clutch during the slip control process can be obtained through formula 1 by monitoring the current pressure, and the motor torque is obtained by subtracting the clutch transfer torque from the driver demand torque and compensated to a motor torque for satisfying the driver demand torque.

Referring to FIG. 6, in the clutch pressure control process in which the transmission input speed (motor speed) is equal to or higher than the engine idle speed, that is, in the process of feedback-controlling the clutch pressure to follow the target delta RPM, the slip start delta RPM (start slip amount) is determined from the driver demand torque and, if the demand torque is high, the impact occurring during the engagement is reduced by providing sufficient slip. The target delta RPM (target slip amount) is defined as a profile according to time by applying a three-dimensional table (3-D table), and the start point of the profile is set to a delta RPM at the slip start time point determined from the driver demand torque. Moreover, a difference between the target delta RPM and the current delta RPM is regarded as an error to perform the PI control, and an output of a PI controller becomes a target pressure.

Meanwhile, if the transmission input speed is lower than the idle speed of the engine, a situation in which the engine cranking is not maintained and thereby the engine is turned off would occur. Accordingly, the second control mode is performed, which will be described below.

First, as shown in FIGS. 5 and 9, the cranking torque control and the feedback control of the ISG are performed while the motor torque control is performed to satisfy the driver demand torque during engine start-up, and the engine cranking and ignition are performed. Then, after the initial fill control of the clutch is performed (S151), it is determined whether the engine has reached complete explosion (S152).

If it is determined that the engine has reached complete explosion, the engine speed is increased up to the idle speed (S153) and, if the engine speed reaches the idle speed, an open-loop pressure control of the clutch is performed (S155).

Then, if the delta RPM is reduced below a predetermined synchronization reference value (Sync Delta rpm), a maximum clutch pressure is applied (S156 and S157). If a predetermined reference time elapses after applying the maximum pressure, the mode change to HEV is completed, and then the HEV mode control is performed (S158 and S159).

In the second control mode, the clutch pressure is applied so that the clutch can transfer a torque as much as the optimal engine torque of the operation point determination circuit in a transitional situation in which the EV mode is changed to the HEV mode. In the case where the coulomb friction transfer torque of formula 1 is used, the optimal engine torque of the operation point determination circuit becomes the clutch transfer torque, and thereby a clutch control pressure Ps (slip pressure) is determined from the clutch transfer torque (engine torque of the operation point determination circuit) by formula 1. As a result, the pressure according to the respective engine torques is determined.

Referring to FIG. 7, in the clutch pressure control process in which the transmission input speed is lower than the idle speed of the engine, that is, in the open-loop control process for transferring the optimal engine torque of the operation point determination circuit to the clutch, the engine speed is controlled to the idle speed by the ECU, and the clutch pressure is determined by a torque open-loop control so as to output a target transfer torque. At this time, a friction coefficient (mu) is obtained from the delta RPM ($\Delta$rpm) and an ATF temperature (ATF temp), and the clutch pressure is calculated based on the number of clutch friction plates, the clutch effective radius, the friction coefficient and the optimal engine torque (clutch transfer torque) of the operation point determination circuit). Here, the friction coefficient is a value predetermined according to the delta RPM and the ATF temperature.

Since the load is not high during vehicle acceleration on a flat road by the engine or idle creep on the flat road, the transmission input speed is increased above the engine idle speed by maintaining the slip of the clutch, and thereby the clutch can be locked up; however, in a situation where the transmission speed cannot be increased due to a high load such as a steep slope, the clip of the clutch is maintained, and thus it is difficult to determine an accurate target slip amount. In this case, the torque to be transferred to the clutch is calculated based on the driver's demand, and then the pressure can be calculated using the torque.

The reason that the two control modes are selectively performed according to the transmission input speed and the engine idle speed in the present invention in the above manner will be described below.

(1) Transmission Input Speed (Motor Speed)>Engine Idle Speed

In this case, even if the clutch is locked up, the engine can be stably operated. However, in the case where the engine speed is suddenly increased such as a sudden acceleration, if the clutch is locked up, an impact may occur. Accordingly, after the engine speed is increased to a predetermined level, the feedback control according to the target slip amount is performed to improve the driving performance.

(2) Transmission Input Speed (Motor Speed)<Engine Idle Speed

When the clutch is locked up in this case, the engine may be turned off since the engine speed is lower than the idle speed. In a situation where the vehicle load is small (e.g., vehicle is driven on a flat road), clutch engagement is possible as the motor speed (transmission input speed) is increased over the engine idle speed. On the other hand, in a situation where the slip is continuously required since the motor speed cannot be increased over the engine idle speed (e.g., vehicle is driven on a high steep), there are difficulties in detecting the hill-climbing driving operation and differentiating the target slip amounts according to the respective load values. However, in case of the second control mode, the transfer torque of the clutch has a pressure value that corresponds to the engine torque of the operation point determination circuit under such high load conditions. The second control mode does work well even under varying load conditions, thus being able to maintain the slip of the clutch continuously.

As described above, during the mode change from EV to HEV, the transmission input speed is compared with the engine idle speed and, if the transmission input speed is lower than the engine idle speed, the clutch pressure is open-loop controlled so that the optimal engine torque of the operation point determination circuit can be transferred to the clutch, whereas, if the transmission input speed is equal to or higher than the engine idle speed, the clutch pressure is feedback-controlled so that the delta RPM follows the target delta RPM profile. With the control method, it is possible to simplify the algorithm and thereby reduce the processing load of the controller when the clutch is controlled during the EV to HEV mode change. Moreover, it is possible to improve the driving performance and the power performance and provide a more stable vehicle behavior control.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A mode change control method of a hybrid vehicle, the method comprising:

(a) comparing a transmission input speed with an engine idle speed, when a mode change from EV to HEV is required;

(b) when it is determined that the transmission input speed is less than the engine idle speed, open-loop controlling, by a controller, a pressure of a clutch so that an optimal engine torque of an operation point determination circuit is transferred through the clutch after engine complete explosion and engine speed increase control occur, wherein the engine speed is increased up to the engine idle speed, which is a target engine speed for slip, and (c) when it is determined that the transmission input speed is higher than the engine idle speed, feedback controlling, by the controller, the clutch pressure so that a delta RPM follows a predetermined target delta RPM profile after engine complete explosion and the engine speed is increased until the delta RPM reaches a slip start delta RPM; and (d) applying a maximum clutch pressure, when the delta RPM, which is a difference between the engine speed and a motor speed, is reduced below a predetermined synchronization reference value until a predetermined reference time elapses, thus completing the EV to HEV mode change, wherein the predetermined synchronization reference value is a threshold value which is used to determine that speeds of both sides of the clutch have been synchronized and the predetermined reference time is a time threshold value for a predetermined delay after applying the maximum clutch pressure.

2. The method of claim 1, wherein the engine is controlled by a torque profile for increasing the engine speed until the delta RPM reaches a predetermined slip start delta RPM, and the clutch pressure is feedback-controlled upon reaching the slip start delta RPM.

3. The method of claim 2, wherein the slip start delta RPM is a value determined according to a driver demand torque, and the target delta RPM is defined as a profile according to time such that a start point of the profile becomes the slip start delta RPM.

4. The method of claim 1, wherein, in step (b), the clutch pressure is determined from a clutch transfer torque calculation formula when a clutch transfer torque is equal to an engine torque of the operation point determination circuit.

* * * * *